(12) United States Patent
Tomita

(10) Patent No.: US 6,684,004 B1
(45) Date of Patent: Jan. 27, 2004

(54) OPTICAL DEMULTIPLEXER CIRCUIT AND DEMULTIPLEXER DEVICE AND OPTICAL WAVELENGTH DIVISION MULTIPLEX CIRCUIT

(75) Inventor: Takaharu Tomita, Kawasaki (JP)

(73) Assignee: Fujitsu Ltd., Kawasaki (JP)

( * ) Notice: Subject to any disclaimer, the term of this patent is extended or adjusted under 35 U.S.C. 154(b) by 0 days.

(21) Appl. No.: 09/507,747

(22) Filed: Feb. 22, 2000

(30) Foreign Application Priority Data

Feb. 19, 1999 (JP) .......................................... 11-041494

(51) Int. Cl.⁷ ................................................ G02B 6/28
(52) U.S. Cl. .............................. 385/24; 385/47; 385/39; 385/31
(58) Field of Search ............................. 385/24, 15, 31, 385/47, 39

(56) References Cited

U.S. PATENT DOCUMENTS 5,608,825 A * 3/1997 Ip .............................. 359/127
6,295,396 B1 * 9/2001 Cao et al. ....................... 385/24
6,304,691 B1 * 10/2001 Espindola et al. ............ 385/24
6,332,054 B1 * 12/2001 Ito .............................. 385/123

FOREIGN PATENT DOCUMENTS

JP          8-316912        11/1996

* cited by examiner

*Primary Examiner*—Rodney Bovernick
*Assistant Examiner*—Sung Pak
(74) *Attorney, Agent, or Firm*—Staas & Halsey LLP

(57) ABSTRACT

An optical demultiplexer to reduce the number of expensive dispersion compensators when compensating secondary dispersion during demultiplexing. By providing optical circulators, dispersion compensators, and optical filters that reflect specified wavelengths and transmit wavelengths other than the specified wavelengths from among the outputs of the dispersion compensators, and causing specified wavelengths to make round trips of the dispersion compensators, the dispersion volume of the dispersion compensators is reduced.

16 Claims, 12 Drawing Sheets

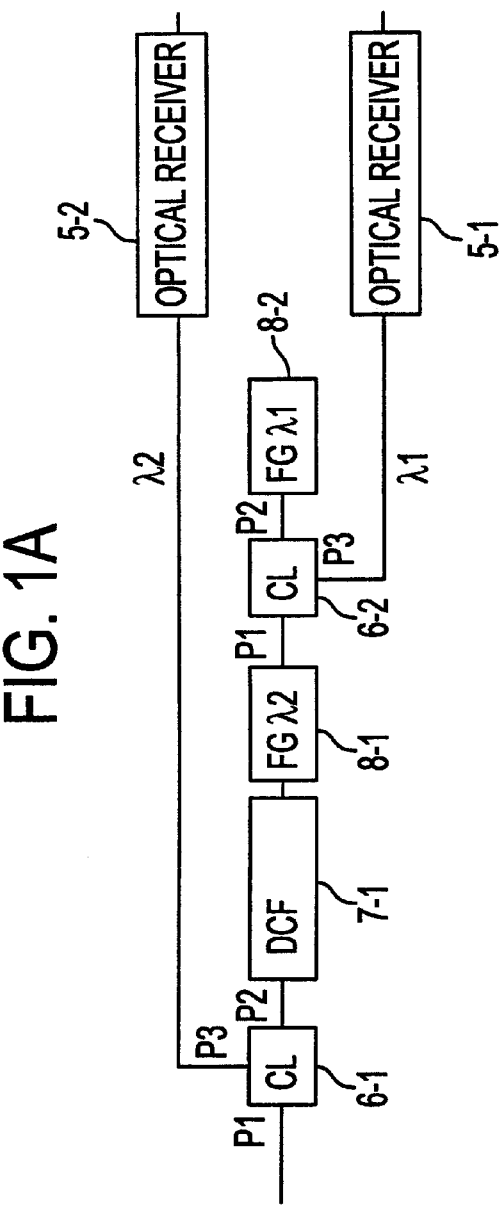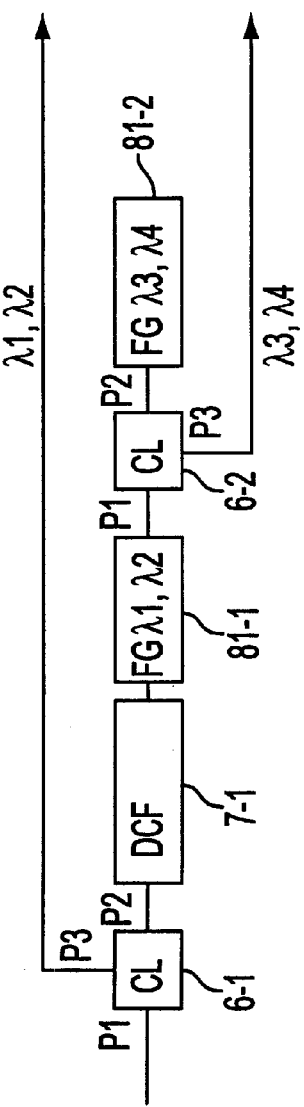

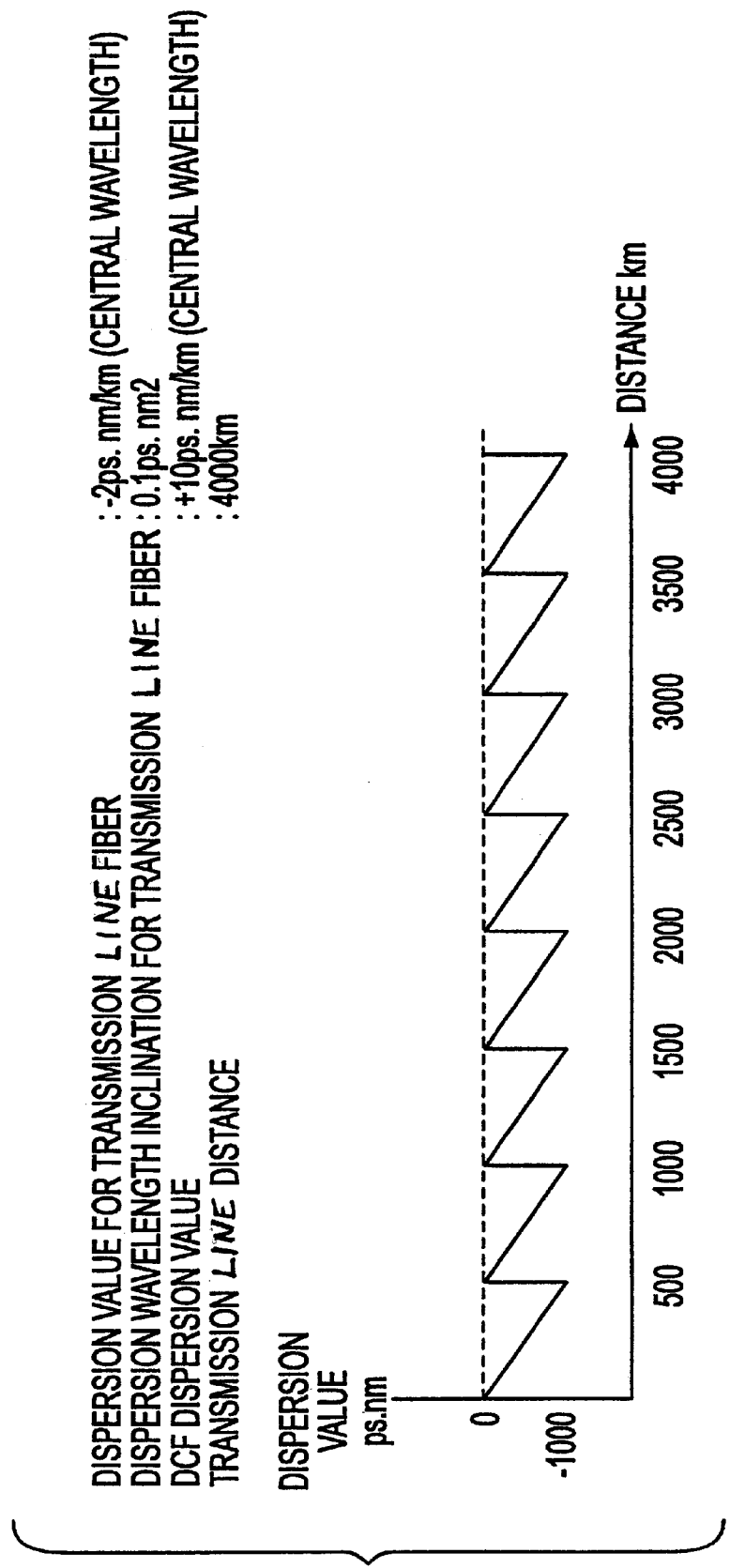

US 6,684,004 B1

OPTICAL DEMULTIPLEXER CIRCUIT AND DEMULTIPLEXER DEVICE AND OPTICAL WAVELENGTH DIVISION MULTIPLEX CIRCUIT

CROSS-REFERENCE TO RELATED APPLICATIONS

This application is based upon and claims priority of Japanese Patent Application No. 11-041494, filed Feb. 19, 1999, the contents being incorporated herein by reference.

BACKGROUND OF THE INVENTION

1. Field of the Invention

The present invention relates to an optical transmission system employing an optical wavelength division demultiplexing system and, more particularly, the present invention relates to an optical demultiplexer device which performs demultiplexing using a reduced number of dispersion compensators.

2. Description of the Related Art

Recently, the number of multiplexed wavelengths in an optical wavelength division multiplexing system has increased, from thirty-two (32) wavelengths, to sixty-four (64) wavelengths, to one-hundred twenty-eight (128) wavelengths. Furthermore, transmission signal speeds have increased from 2.5 Gb/s, to 5 Gb/s, to 100 Gb/s, and capacity has increased.

As transmission signal speeds of wavelength division multiplexing systems increase, the penalty rate increases for the self-phase modulation caused by the group velocity dispersion (GVD) of the optical fiber that is the transmission path. Accordingly, the transmission line necessitates measures to decrease the penalty rate for GVD.

FIG. 12 is a dispersion map showing a relationship between a transmission line and a central wavelength. As shown in FIG. 12, the fiber or optical device having the dispersion value of the transmission path and the opposite dispersion value is inserted into the transmission path, and at a prescribed interval in the transmission path the dispersion value becomes zero. However, because the dispersion characteristics of the transmission path are dependent upon wavelength, when the wavelength division multiplexing system is used, as shown in FIG. 11, even if the dispersion value of the central wavelength is set at zero, the dispersion cannot be set for all the wavelengths.

In order to compensate for the dependence of dispersion value on wavelength, the dispersion is compensated for each wavelength at a reception station. FIG. 10 is a block diagram of a conventional demultiplexer device for performing dispersion compensation at a reception station for a transmission of 4,000 kilometers.

As shown in FIG. 10, the demultiplexer system for dispersion compensation includes optical amplifiers 1-1 through 1-7, dispersion compensators (dispersion compensation fibers) 2-1 through 2-6, a wavelength demultiplexer unit coupler 3, optical filters 4-1 through 4-5, and optical receivers 5-1 through 5-5. Light having respective wavelengths $\lambda 1$ through $\lambda 5$ is wavelength division multiplexed at an interval of 1 nm. After amplification by the optical amplifier 1-1, the light having a central wavelength of $\lambda 3$ is compensated so that it has a dispersion value of zero (0).

After the light from the dispersion compensator 2-6 is amplified by the optical amplifier 1-2, it is separated by the wavelength demultiplexer unit coupler 3 into wavelengths $\lambda 1$ through $\lambda 5$ and input into optical filters 4-1 through 4-5, respectively, which correspond to each wavelength. The outputs from optical filters 4-1 through 4-5 are amplified by the optical amplifiers 1-3 through 1-7, respectively, and input into dispersion compensators 2-1 through 2-5.

Dispersion compensator 2-1 applies dispersion of +800 ps. Dispersion compensator 2-2 applies dispersion of +400 ps. Dispersion compensator 2-3 applies dispersion of 0 ps. Dispersion compensator 2-4 applies dispersion of −400 ps. Dispersion compensator 2-5 applies dispersion of −800 ps. The outputs of dispersion compensators 2-1 through 2-5 are photoelectrically converted by optical receivers 5-1 through 5-5, respectively.

In the above-described manner, by compensating with different dispersion values using dispersion compensators 2-1 through 2-5, dispersion conversion is performed such that all dispersion volumes between the wavelengths are zero (0).

However, as shown in FIG. 10, when a dispersion compensator corresponding to each wavelength is provided, expensive dispersion compensators require the value equivalent to the compensation value.

SUMMARY OF THE INVENTION

It is an object of the present invention to provide a demultiplexer device for demultiplex system which reduces the use of expensive dispersion compensators by half while performing demultiplexing.

It is another object of the present invention to provide a demultiplexing device for demultiplex system which performs demultiplexing without the use of wavelength demultiplexing couplers.

Objects and advantages of the present invention are achieved in accordance with embodiments of the present invention with an optical demultiplexer device for an optical wavelength demultiplexer system, comprising an optical circulator, a dispersion compensator, and an optical filter. A particular wavelength of light is divided by the optical filter, round tripped through the dispersion compensator and output from the optical circulator. A wavelength of light different from the particular wavelength of light passes through the dispersion compensator and optical filter and is output from the optical filter.

Objects and advantages of the present invention are achieved with an optical demultiplexer device, comprising a first optical demultiplexer circuit, including a first optical circulator having a first port, a second port and a third port, wherein multiplexed light is input into the first port, and the light input to the first port is output from the second port, and light input into the second port is output from the third port; a dispersion compensator having an input unit and an output unit, the dispersion compensator being coupled to the second port of the first optical circulator at one of the input or output unit; a first filter coupled to another of the input or output unit to reflect light having a specified wavelength and to transmit light having a wavelength other than the specified wavelength; a second optical circulator having a first port, a second port and a third port, wherein the light transmitted by the first optical filter is input to the first port; and a second optical filter coupled to the second port of the second optical circulator to reflect light having the specified wavelength.

The optical demultiplexer device may further comprise a second optical demultiplexer circuit, including a first optical circulator having a first port, a second port and a third port, wherein multiplexed light is input into the first port, and the light input to the first port is output from the second port, and light input into the second port is output from the third port; a dispersion compensator having an input unit and an output unit, the dispersion compensator being coupled to the second port of the first optical circulator at one of the input or output unit; a first optical filter coupled to another of the input or output unit to reflect light having a specified wavelength and to transmit light having a wavelength other than the specified wavelength; a second optical circulator having a first port, a second port and a third port, wherein the light transmitted by the first optical filter is input to the first port; and a second filter coupled to the second port of the second optical circulator to reflect light having at least one specified wavelength.

In accordance with the present invention, multiplexed light that is branched into a plurality of wavelengths is input into the first port of the first optical circulator of the first optical demultiplexer circuit, and is input into the first port of the first optical circulator of the second optical demultiplexer circuit.

In accordance with embodiments of the present invention, the third port of the first optical circulator of the first demultiplexer circuit is coupled to the first port of the first optical circulator of the second optical demultiplexer circuit.

Objects and advantages of the present invention are achieved in accordance with embodiments of the present invention with demultiplexer device comprising a first unit, including a first optical circulator having a first port, a second port and a third port, wherein multiplexed light is input to the first port, and the light input to the first port is output from the second port, and light input into the second port is output from the third port; a first dispersion compensator having one of an input or an output end connected to a second port of the first optical circulator; and a first filter connected to the other input or output end of the first dispersion compensator to reflect light having a specified wavelength and to transmit light having a wavelength other than the specified wavelength; a second unit, including a second optical circulator having a first port, a second port and a third port, wherein the first port of the second optical circulator is coupled to the third port of the first optical circulator, and light input to the first port of the second optical circulator is output to the second port of the second optical circulator, and light input to the second port of the second optical circulator is output to the third port of the second optical circulator; and a second filter coupled to the second port of the second optical circulator to reflect light having a specified wavelength and to transmit light having a wavelength other than the specified wavelength.

In accordance with embodiments of the invention, the demultiplexer device comprises a plurality of first units and second units, and the first port of the first optical circulator of the first unit is coupled to the third port of the second optical circulator of the second unit, and the first unit and the second unit are respectively consecutively repeated.

Objects and advantages of the present invention are achieved in accordance with embodiments of the present invention with a wavelength division multiplexing device comprising a first wavelength division multiplexing circuit, including an optical coupler to merge light having different wavelengths from a plurality of light sources; an optical circulator including a first port, a second port and a third port, wherein the first port receives an output from the optical coupler, and the light input to the first port is output to the second port, and light input to the second port is output from the third port; a dispersion compensator connected at one of an input or output end to the second port of the optical circulator; an optical filter coupled to an other end of the dispersion compensator to reflect light having a specified wavelength and to transmit light having a wavelength other than the specified wavelength; and an optical coupler to merge the output of the optical filter and the output of the third port of the optical circulator.

The wavelength division multiplexing device may further comprise a second wavelength division multiplexing circuit, including an optical coupler to merge light having different wavelengths from a plurality of light sources; an optical circulator including a first port, a second port and a third port, wherein the first port receives an output from the optical coupler,-and the light input to the first port is output to the second port, and the light input to the second port is output from the third port; a dispersion compensator having an input end and an output end, and coupled at either one of the input or the output end to the second port of the optical circulator; an optical filter coupled to an other end of the dispersion compensator to reflect light having a specified wavelength and to transmit light having a wavelength other than the specified wavelength; and an optical coupler to merge the output of the optical filter and the output of the third port of the optical circulator.

The wavelength division multiplexing device may further comprise an optical coupler to merge outputs of the optical couplers of the first wavelength division multiplexing circuit and the second wavelength division multiplexing circuit.

Objects and advantages of the present invention are achieved in accordance with embodiments of the present invention with an optical wavelength multiplexing device, comprising a plurality of wavelength division multiplexing circuits, each of the plurality of circuits including an optical coupler to merge light having different wavelengths from a plurality of light sources and to output the merged light; an optical circulator having a first port, a second port and a third port, wherein the first port inputs the output from the optical coupler, and the light from the first port is output to the second port, and the light from the second port is output to the third port; a dispersion compensator having an input end and an output end and coupled at one of the input or the output end to the second port of the optical circulator; an optical filter coupled to the other end of the dispersion compensator to reflect light having a specified wavelength and to transmit light having a wavelength other than the specified wavelength; and an optical coupler to merge the respective outputs of the third ports of the optical circulators of the plurality of wavelength division multiplexing circuits.

Objects and advantages of the present invention are achieved with an optical wavelength multiplexing device, comprising a plurality of dispersion compensation units, the respective dispersion compensation units including an optical coupler to merge light having different wavelengths from a plurality of light sources and to output the merged light; an optical circulator having a first port, a second port and a third port, wherein the first port receives the output from the optical coupler, and the light output from the first port is input to the second port, and the light input to the second port is output from the third port; a dispersion compensator having an input end and an output end, and coupled at one of the input or the output end to the second port of the optical circulator; an optical filter coupled to the other end of the dispersion compensator to reflect a specified wavelength and to transmit light having a wavelength other than the specified wavelength; and an optical coupler to merge the output of the optical filter and the output of the third port of the circulator of units of the plurality of dispersion compensation units.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 1A and 1B respectively illustrate optical wavelength demultiplexers in accordance with embodiments of the present invention.

FIG. 12 is a dispersion map showing the relationship between the transmission line and the central wavelength of the conventional demultiplexer.

DESCRIPTION OF THE PREFERRED EMBODIMENTS

Figure 2:
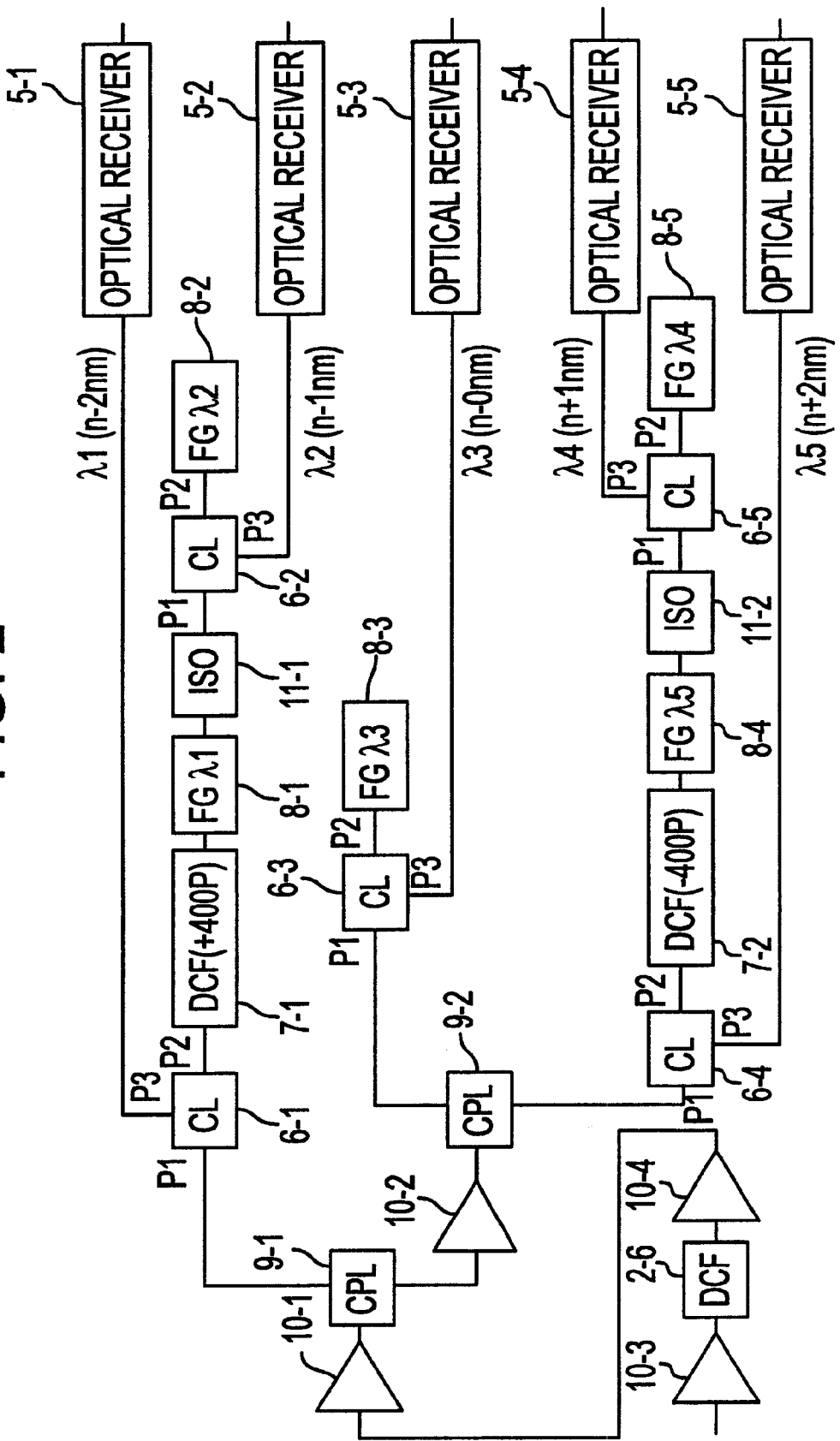
FIG. 2 is a block diagram of the circuit shown in FIGS. 1A and 1B applied in a wavelength division multiplexer in accordance with embodiments of the present invention.

Reference will now be made in detail to the preferred embodiments of the present invention, examples of which are illustrated in the accompanying drawings, wherein like reference numerals refer to like elements throughout.

FIGS. 1A and 1B respectively illustrate optical demultiplexer devices in accordance with embodiments of the present invention. As shown in FIGS. 1A and 1B, the optical demultiplexer devices include optical circulators 6-1 and 6-2, a dispersion compensator 7-1, and fiber grating filters 8-1, 8-2, 81-1, 81-2. As shown in FIG. 1A, optical receivers 5-1 and 5-2 receive light corresponding to the respective wavelengths of light $\lambda 1$ and $\lambda 2$, which are different wavelengths.

In operation of the optical demultiplexer device shown in FIG. 1A, first, light in which wavelength $\lambda 1$ and wavelength $\lambda 2$ have been wavelength division multiplexed is input at a first port P1 of a first optical circulator 6-1. The light input at the first port P1 of the first optical circulator 6-1 is input at one of the input/output ends of the dispersion compensator 7-1, is dispersed at a prescribed positive or negative dispersion value, and is input to the fiber grating filter 8-1.

The fiber grating filter 8-1 reflects the $\lambda 2$ wavelength light and returns the light having $\lambda 2$ wavelength to the dispersion compensator 7-1. Other wavelengths, in this case $\lambda 1$, are transmitted by the fiber grating filter 8-1 and input at the first port P1 of a second optical circulator 6-2.

The light having wavelength $\lambda 1$ input into the first port P1 of the second optical circulator 6-2 is output from a port P2 of the second optical circulator 6-2. The light having wavelength $\lambda 1$ is reflected by the fiber grating filter 8-2, is input into the port P2 of the second optical circulator 6-2 and is output from a port P3 of the second optical circulator 6-2. The light having wavelength $\lambda 1$ output from the port P3 of the second optical circulator 6-2 undergoes optoelectric conversion at the optical receiver 5-1.

The light having wavelength $\lambda 2$ reflected by the fiber grating filter 8-1 undergoes dispersion at a prescribed value again at the dispersion compensator 7-1, is input into the port P2 of the first optical circulator 6-1, and is output from the port P3 of the first optical circulator 6-1. The light having wavelength $\lambda 2$ output from the port P3 of the first optical circulator 6-1 undergoes optoelectric conversion at the optical receiver 5-2.

In accordance with the embodiment of the invention shown in FIG. 1A, wavelength division multiplexed light is demultiplexed, and, because wavelength $\lambda 2$ passes through the dispersion compensator 7-1 twice, dispersion compensators may be used that have half the required dispersion compensation value. Furthermore, because the light having wavelength $\lambda 1$ passes through the dispersion compensator 7-1 once, the dispersion compensation for $\lambda 1$ is also performed.

Figure 11:
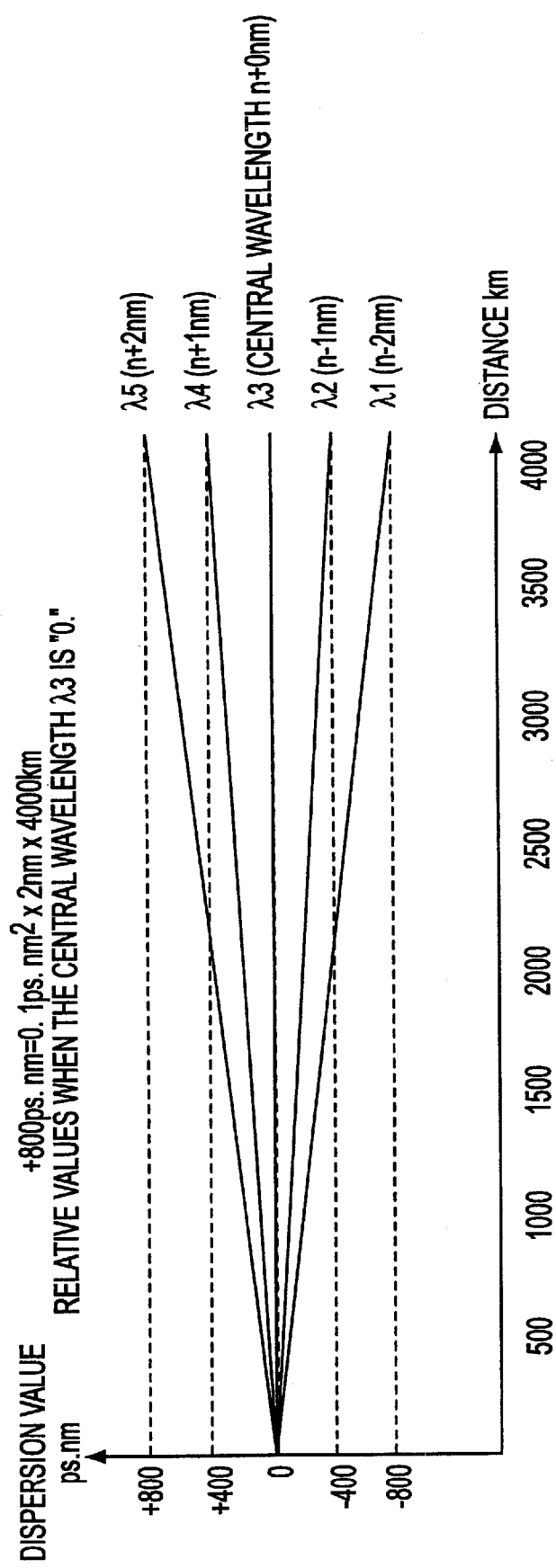
FIG. 11 is a graph showing the characteristics of secondary dispersion of the conventional demultiplexer.

When the transmission characteristics shown in FIG. 11 are considered, by making zero (0) dispersion for a specified wavelength when the wavelengths are spaced equally, it can be determined whether an excessive dispersion valve or too sparse a dispersion value has been taken, by making comparisons with the interval between other wavelengths.

By matching the value of the wavelength with zero (0) dispersion in the transmission route of wavelengths $\lambda 1$ and $\lambda 2$ using the relationship shown in FIG. 11, an appropriate value is selected. Thus, in accordance with the embodiment shown in FIG. 1, the dispersion compensation of $\lambda 1$ and $\lambda 2$ can be performed by one dispersion compensator.

A dispersion compensation fiber (DCF) is preferably used for the dispersion compensator 7-1. However, a switch can be made to operate in the same manner as a dispersion compensation fiber (DCF) if the same dispersion compensation value can be obtained even if the input/output direction is changed from two input/output ends.

FIG. 1B illustrates an optical demultiplexer which operates in the same manner as the optical demultiplexer shown in FIG. 1A, except that the fiber grating filters 81-1 and 81-2 are different from the fiber grating filters 8-1 and 8-2.

The fiber grating filter 81-1 in FIG. 1B reflects wavelengths $\lambda 1$ and $\lambda 2$ and transmits other wavelengths. The fiber grating filter 81-2 reflects wavelengths $\lambda 3$ and $\lambda 4$.

By using the fiber grating filters 81-1, 81-2, a plurality of wavelengths can undergo dispersion compensation in groups. This is effective if the transmission distance is short, or if the dispersion value matches a specific wavelength in the group with a high bit rate, the conditions of FIG. 1A are met, and near that wavelength the other wavelengths are positioned in the group, which have low bit rates.

FIG. 2 is a block diagram illustrating the optical demultiplexers shown in FIGS. 1A and 1B applied to a wavelength division multiplexer in accordance with embodiments of the present invention.

As shown in FIG. 11, when wavelengths λ1 through λ5 are transmitted, the wavelength division multiplexing device sets the wavelength λ3 at zero (0) dispersion wavelength. Further, as shown in FIG. 12, at prescribed locations along the 4000 Km transmission route wavelength λ3 has a dispersion value of zero (0).

The light from the transmission line is amplified by optical amplifier 10-3 to a prescribed level, is input into the dispersion compensator 2-6, and a dispersion value is applied by the dispersion compensator such that the wavelength λ3 becomes zero (0) at the dispersion compensator 2-6.

The dispersion compensation volume of the dispersion compensator 2-6 has a dispersion value for correcting the dispersion value of wavelength λ3 to zero (0) at the 4,000 km point of FIG. 12.

The output of the dispersion compensator 2-6 is amplified by an optical amplifier 10-4 such that it reaches a prescribed level, including the compensation portion for the loss due to the dispersion compensator 2-6.

Both optical amplifiers 10-3 and 10-4 are adjusted so that for the optical wavelength used a gain differential does not arise due to the gain characteristics for each wavelength.

An optical amplifier 10-1 is a 3 dB amplifier that compensates for branching loss at an optical branching coupler 9-1 at the next step. If necessary, the optical amplifier 10-1 can be omitted by increasing the gain of the optical amplifier 10-4. The light branched by the optical branching coupler 9-1 is input to the port P1 of the optical circulator 6-1 and is input to the optical amplifier 10-2.

The light having all wavelengths λ1–λ5 input at the port P1 of the optical circulator 6-1 is output through the port P2 of the optical circulator 6-1, and input to one end of the dispersion compensator 7-1, which is preferably formed from dispersion compensation fiber. Dispersion of +400 ps is applied by the dispersion compensator 7-1 and the light having all wavelengths λ1–λ5 is output through the other end of the dispersion compensator 7-1.

Of the light output through the other end of the dispersion compensator 7-1, light having the wavelength λ1 is reflected by the fiber grating filter 8-1. The reflected light having wavelength λ1 is input again into the dispersion compensator 7-1, and light having wavelengths other than λ1 is transmitted through the fiber grating filter 8-1, input via an optical isolator 11-1 into the port P1 of the optical circulator 6-2, and then output from the port P2 of the optical circulator 6-2.

The light output from the port P2 of the optical circulator 6-2 is input into the fiber grating filter 8-2. Light having wavelength λ2 is reflected by the fiber grating filter 8-2 and all other wavelengths are transmitted. The light having the wavelength λ2 reflected by the fiber grating filter 8-2 is input into the port P2 of the optical circulator 6-2, output from the port P3 of the optical circulator 6-2, and optoelectrically converted by the optical receiver 5-2.

The light having wavelength λ1 reflected by the fiber grating filter 8-1 is input again into the dispersion compensator 7-1, input into the port P2 of the optical circulator 6-1 and output from the port P3 of the optical circulator 6-1. The output from the port P3 of the optical circulator 6-1 is input into the optical receiver 5-1 and is optoelectrically converted by the optical receiver 5-1.

The light having a wavelength λ1 makes a round-trip through the dispersion compensator 7-1, and thus a dispersion of +800 ps is applied. The light having wavelength λ2 passes through the dispersion compensator 7-1 only once, and thus a dispersion of only +400 ps is applied.

By removing the light reflected by the fiber grating filters 8-1 and 8-2 with the optical circulators 6-1 and 6-2, respectively, both demultiplexing and dispersion compensation can be performed simultaneously.

The optical amplifier 10-2 preferably has a gain of 3 dB in order to compensate for the loss of 3 dB arising during branching at the optical branching coupler 9-2. One output of the optical coupler 9-2 is input into the port P1 of the optical circulator 6-3 and output from the port P2 of the optical circulator 6-3.

Of the output from the port P2 of the optical circulator 6-3, the wavelength λ3 is reflected by the fiber grating filter 8-3, input into the port P2 of the optical circulator 6-3, and output from the port P3 of the optical circulator 6-3. The light having the wavelength λ3 output from the port P3 of the optical circulator 6-3 is input into the optical receiver 5-3 and undergoes optoelectric conversion.

The other output from the optical coupler 9-2 is input into the port P1 of the optical circulator 6-4, output from the port P2 of the optical circulator 6-4, and input at one end of the dispersion compensator 7-2, which is preferably formed from dispersion compensation fiber. Dispersion of −400 ps is applied by the dispersion compensator 7-2 and the light is then output through the other end of the dispersion compensator 7-2.

Of the light output through the other end of the dispersion compensator 7-2, light having the wavelength of λ5 is reflected by the fiber grating filter 8-4. The light is input again into the dispersion compensator 7-2, and light having wavelengths other than λ5 is transmitted through the fiber grating filter 8-4, input via an optical isolator 11-2 into the port P1 of the optical circulator 6-5, and then output from the port P2 of the optical circulator 6-5.

The light having wavelengths other than λ5 output from the port P2 of the optical circulator 6-5 is input into the fiber grating filter 8-5. Light having the wavelength λ4 is reflected by the fiber grating filter 8-5 and all other wavelengths are transmitted. The light having the wavelength λ4 reflected by the fiber grating filter 8-5 is input into the port P2 of the optical circulator 6-5, output from the port P3 of the optical circulator 6-5, and optoelectrically converted by the optical receiver 5-4.

The light having wavelength λ5 reflected by the fiber grating filter 8-4 is input again into the dispersion compensator 7-2, input into the port P2 of the optical circulator 6-4 and output from the port P3 of the optical circulator 6-4. The output from the port P3 of the optical circulator 6-4 is input into the optical receiver 5-5 and is optoelectrically converted.

In accordance with the embodiment of the invention shown in FIG. 2, the light having wavelength λ5 makes a round-trip through the dispersion compensator 7-2, and thus a dispersion of −800 ps is applied. The light having wavelength λ4 passes through the dispersion compensator 7-2 only once, and thus a dispersion of only −400 ps is applied.

Further, by removing at optical circulators 6-4 and 6-5 the light reflected at the fiber grating filters 8-4 and 8-5, respectively, both demultiplexing and dispersion compensation can be performed simultaneously.

In accordance with the embodiment shown in FIG. 2, optical isolators 11-1 and 11-2 are effective in that isolators are inserted when an unnecessary wavelength is radiated to the fiber grating filters 8-1 and 8-4, or when there is abnormal reflection.

In accordance with the embodiment of the invention shown in FIG. 2, by arranging a plurality of units, as shown in FIG. 1A, at the optical coupler that simplify the dispersion compensation, and by performing wavelength branching, demultiplexing can be performed with a reduced number of dispersion compensators even when the number of multiplexed wavelengths is high.

Figure 3:
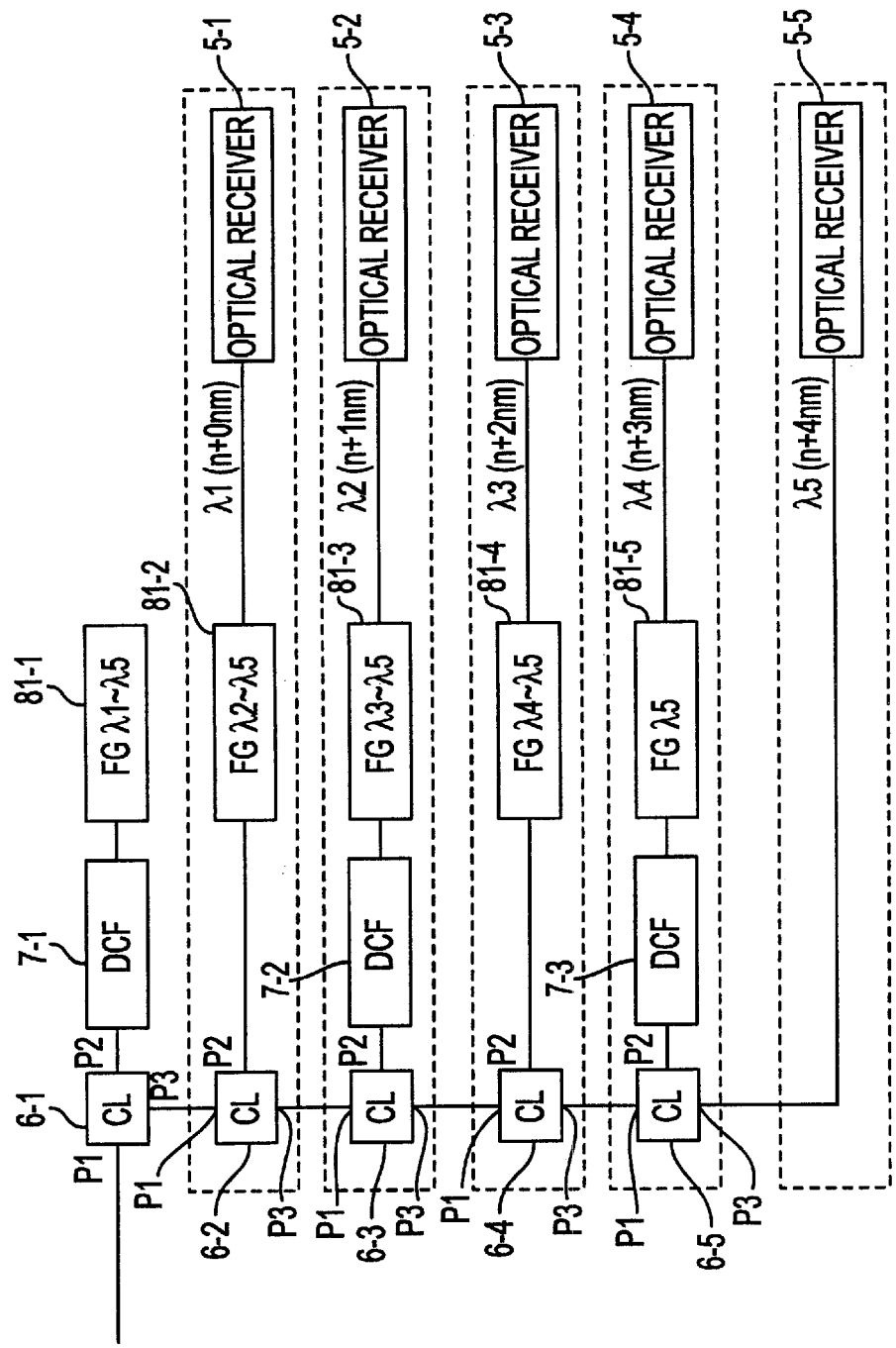
FIG. 3 is a block diagram of an optical demultiplexer device in accordance with embodiments of the present invention.

FIG. 3 is a block diagram of an optical demultiplexer system in accordance with embodiments of the present invention.

Figure 4:
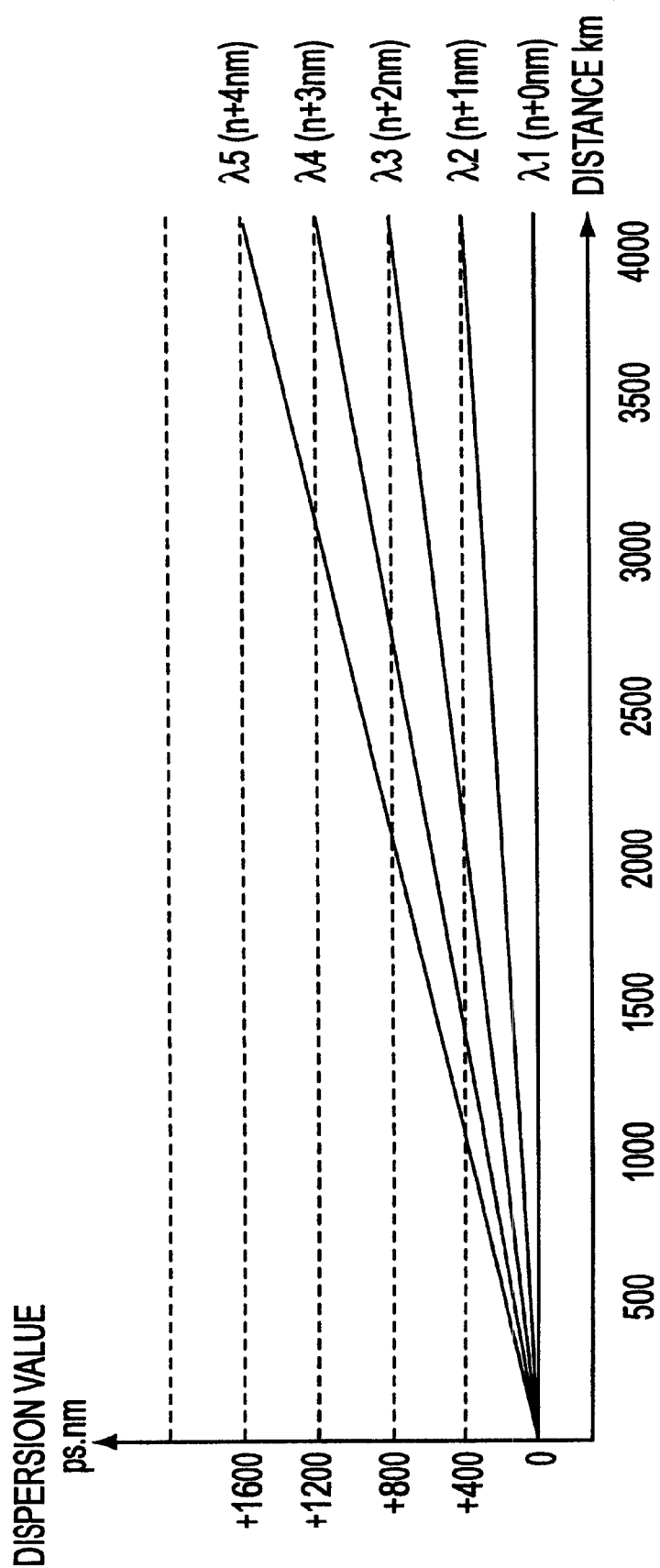
FIG. 4 is a graph illustrating the wavelength placement in accordance with embodiments of the present invention.

The system shown in FIG. 3 dispersion compensates for the dispersion values shown in the 4,000 km transmission line dispersion map shown in FIG. 4.

In accordance with the embodiment of the invention shown in FIG. 3, the respective wavelengths of light $\lambda 1$ through $\lambda 5$ input into the transmission line are spaced at equal intervals of 1 nm. The optical multiplexed signal from the transmission line, in which light having the wavelengths $\lambda 1$ through $\lambda 5$ has been multiplexed, is input into the port P1 of the optical circulator 6-1 and output from the port P2 of the optical circulator 6-1.

The light output from the port P2 of the optical circulator 6-1 is input into either of the input/output ends of the dispersion compensator 7-1, which is preferably made from dispersion 20 compensation fiber, and is then output to the fiber grating filter 81-1. The dispersion value of the dispersion compensator 7-1 is half the dispersion volume of the value at which the wavelength $\lambda 1$ has zero (0) dispersion.

Each of the wavelengths $\lambda 1$ through $\lambda 5$ is reflected by the fiber grating filter 81-1. The wavelengths $\lambda 1$ through $\lambda 5$ reflected by the fiber grating filter 81-1 are input via the dispersion compensator 7-1 into the port P2 of the optical circulator 6-1 and output through the port P3 of the optical circulator 6-1.

Because the wavelengths $\lambda 1$ through $\lambda 5$ pass through the dispersion compensator 7-1 twice, the dispersion volume of the dispersion compensator for making the dispersion of the wavelength $\lambda 1$ zero (0) can be made half the volume.

The light output from the port P3 of the optical circulator 6-1 is input into the port P1 of the optical circulator 6-2 and output from the port P2 of the optical circulator 6-2.

The fiber grating filter 81-2 reflects wavelengths $\lambda 2$ through $\lambda 5$ output from the port P2 of the optical circulator 6-2. The remaining light having wavelength $\lambda 1$ is input into the fiber grating filter 81-2, which transmits the light having wavelength $\lambda 1$. Light having wavelength $\lambda 1$ output from the fiber grating filter 81-2 is optoelectrically converted by the optical receiver 5-1.

The light having wavelengths $\lambda 2$ through $\lambda 5$ reflected by the fiber grating filter 81-2 is input at the port P2 of the optical circulator 6-2 and output from the port P3 of the optical circulator 6-2. The light having wavelengths $\lambda 2$ through $\lambda 5$ output from the port P3 of the optical circulator 6-2 is input to the port P1 of the optical circulator 6-3 and output from the port P2 of the optical circulator 6-3.

The light having wavelengths $\lambda 2$ through $\lambda 5$ output from the port P2 of the optical circulator 6-3 is input into either of the input/output ends of the dispersion compensator 7-2, which is preferably made of dispersion compensation fiber. A dispersion of −400 ps is applied by the dispersion compensator 7-2 to the light having wavelengths $\lambda 2$ through $\lambda 5$, and the light is output through the other input/output end of the dispersion compensator 7-2 into the fiber grating filter 81-3.

The fiber grating filter 81-3 reflects the light having wavelengths $\lambda 3$ through $\lambda 5$. The remaining light having wavelength $\lambda 2$ is transmitted input into the optical receiver 5-2 and is optoelectrically converted.

The light having wavelengths $\lambda 3$ through $\lambda 5$ reflected by the fiber grating filter 81-3 is input again into the dispersion compensator 7-2, a dispersion of −400 ps is applied to the light having wavelengths $\lambda 3$ through $\lambda 5$, and the output of dispersion compensator 7-2 is input into the port P2 of the optical circulator 6-3 and output from the port P3 of the optical circulator 6-3.

The light having wavelengths $\lambda 3$ through $\lambda 5$ output from the port P3 of the optical circulator 6-3 is input into the port P1 of the optical circulator 6-4 and output from the port P2 of the optical circulator 6-4. Of the light output from the port P2 of the optical circulator 6-4, the light having wavelengths $\lambda 4$ and $\lambda 5$ is reflected by the fiber grating filter 81-4, and the remaining light having the wavelength of $\lambda 3$ is input into and transmitted by the fiber grating filter 814. The light having the wavelength of $\lambda 3$ transmitted through the fiber grating filter 81-4 is optoelectrically converted by the optical receiver 5-3.

The light having the wavelengths $\lambda 4$ and $\lambda 5$ reflected by the fiber grating filter 81-4 is input into the port P2 of the optical circulator 6-4 and output from the port P3 of the optical circulator 6-4. The light having the wavelengths $\lambda 4$ and $\lambda 5$ output from the port P3 of the optical circulator 6-4 is input into the port P1 of the optical circulator 6-5 and output from the port P2 of the optical circulator 6-5.

The light having the wavelengths $\lambda 4$ and $\lambda 5$ output from port P2 of the optical circulator is input into the dispersion compensator 7-3, which is preferably made of dispersion compensation fiber, and a dispersion of −400 ps is applied. The light having the wavelengths $\lambda 4$ and $\lambda 5$ output from the dispersion compensator 7-3 is input into the fiber grating filter 81-5, which reflects the light of wavelength $\lambda 5$ and transmits the wavelength $\lambda 4$.

The light having the wavelength $\lambda 4$ transmitted through the fiber grating filter 81-5 is optoelectrically converted at the optical receiver 5-4. The reflected light having wavelength $\lambda 5$ is input via the dispersion compensator 7-3 into the port P2 of the optical circulator 6-5 and output from the port P3 of the optical circulator 6-5. The light having the wavelength of $\lambda 5$ output from the port P3 of the optical circulator 6-5 is optoelectrically converted at the optical receiver 5-5.

In accordance with the embodiment of the invention shown in FIG. 3, by connecting units comprising optical circulators and fiber grating filters, and units comprising optical circulators, and dispersion compensators and fiber grating filters and the ports P1 and P3 of the optical circulators of these units and repeating these connections, the number of multiplexed wavelengths can be increased.

Further, in accordance with the embodiment shown in FIG. 3, because round trips are made through the dispersion compensators 7-1, 7-2, 7-3, the dispersion compensation volume of the dispersion compensators can be reduced.

Furthermore, because the intervals between the wavelengths are the same, the dispersion compensators that compensate secondary dispersion can all be configured from common dispersion compensators.

Figure 5:
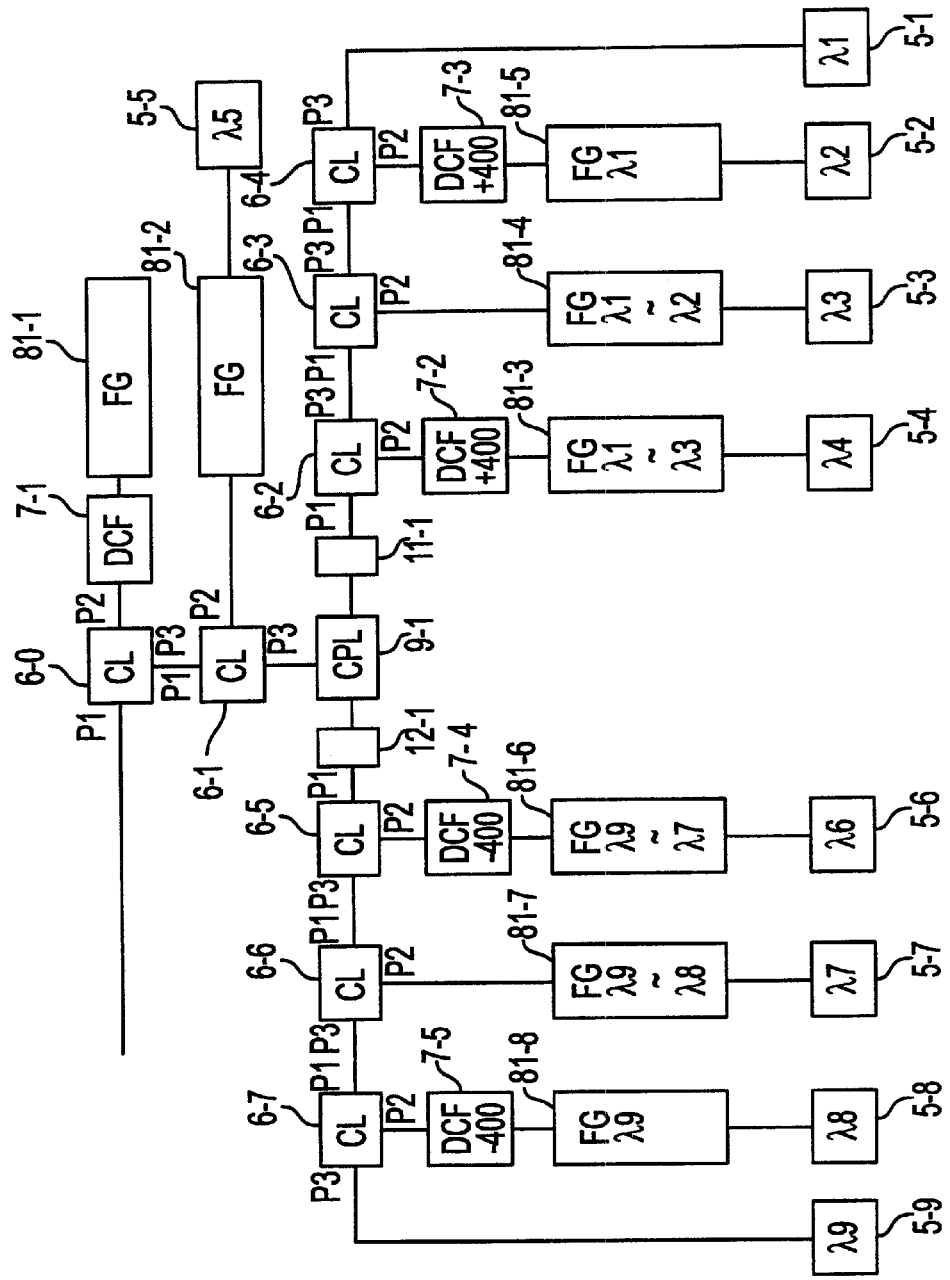
FIG. 5 is a block diagram of an optical demultiplexer in accordance with embodiments of the present invention.

FIG. 5 is a block diagram of a demultiplexer circuit wherein the configuration of FIG. 3 is used, the number of multiplexed wavelengths is increased, and the zero (0) dispersion wavelength is set as the central wavelength of the wavelength division multiplexing in accordance with embodiments of the present invention.

In accordance with the embodiment of the present invention shown in FIG. 5, light having wavelengths $\lambda 1$ through λ9 multiplexed at equal channel space is input into the port P1 of an optical circulator 6-0 and output from the port P2 of the optical circulator 6-0.

The multiplexed light output from the port P2 of the optical circulator 6-0 is input into the dispersion compensator 7-1, which is preferably made of dispersion compensation fiber, and is dispersion compensated at half the volume for central wavelength λ5 to have a dispersion value of zero (0).

The output of dispersion compensator 7-1 is input into the fiber grating filter 81-1. The fiber grating filter 81-1 reflects all the wavelengths between λ1 and λ9. The wavelengths λ1 through λ9 reflected by the fiber grating filter 81-1 are input again into the dispersion compensator 7-1. Thus, the central wavelength λ5 gets a dispersion value of zero (0) and the wavelengths λ1–λ9 are input into the port P2 of the optical circulator 6-0 and output from the port P3 of the optical circulator 6-0.

The light having the wavelengths λ1 through λ9 output from the port P3 of the optical circulator 6-0 is input into the port P1 of the optical circulator 6-1 and then output from the port P2 of the optical circulator 6-1. The light having the wavelengths λ1 through λ9 output from the port P2 of the optical circulator 6-1 is input into the fiber grating filter 81-2. The light other than the light having wavelength λ5 is reflected by the fiber grating filter 81-2 to the port P2 of the optical circulator 6-1, and the light λ5 is transmitted to the optical receiver 5-5 and optoelectrically converted.

The light other than that having a wavelength λ5 input at the port P2 of the optical circulator 6-1 is output from the port P3 of the optical circulator 6-1, input into the optical branching coupler 9-1, and branched into two.

One output of the optical branching coupler 9-1 is input into a low-pass filter 11-1, which transmits lights having wavelengths λ1 through λ4. The light having the wavelengths λ1 through λ4 transmitted through the low-pass filter 11-1 is input in the port P1 of the optical circulator 6-2 and output from the port P2 of the optical circulator 6-2.

The light having the wavelengths λ1 through λ4 output from the port P2 of the optical circulator 6-2 undergoes dispersion compensation of +400 ps by the dispersion compensator 7-2, which is preferably made of dispersion compensation fiber, and is input in the fiber grating filter 81-3. Wavelengths λ1 through λ3 are reflected at the fiber grating filter 81-3 and the wavelength λ4 is transmitted by the fiber grating filter 81-3. The light having wavelength λ4 transmitted by the fiber grating filter 81-3 is input to the optical coupler 5-4 and optoelectrically converted.

The light having the wavelengths λ1 through λ3 reflected by the fiber grating filter 81-3 is input again into the dispersion compensator 7-2 and undergoes dispersion compensation of +400 ps. Thereafter, the light having wavelengths λ1 through λ3 is input into the port P2 of the optical circulator 6-2 and output from the port P3 of the optical circulator 6-2. The light output from the port P3 of the optical circulator 6-2 is input into the port P1 of the optical circulator 6-3 and output from the port P2 of the optical circulator 6-3.

The light output from the port P2 of the optical circulator 6-3 is input into the fiber grating filter 81-4. The fiber grating filter 81-4 reflects the light having wavelengths λ1 and λ2 and transmits light having wavelength λ3. The light with the wavelength λ3 transmitted by the fiber grating filter 81-4 is input into the optical receiver 5-3 and optoelectrically converted.

The light having the wavelengths λ1 and λ2 reflected by the fiber grating filter 81-4 is input into the port P2 of the optical circulator 6-3 and output from the port P3 of the optical circulator 6-3. The light having the wavelengths λ1 and λ2 output from the port P3 of the optical circulator 6-3 is input from the port P1 of the optical circulator 6-4 and output from the port P2 of the optical circulator 6-4.

The light having the wavelengths λ1 and λ2 output from the port P2 of the optical circulator 6-4 undergoes dispersion compensation of +400 ps by the dispersion compensator 7-3, which is made of dispersion compensation fiber, and is input into the fiber grating filter 81-5. The fiber grating filter 81-5 reflects the light having the wavelength λ1 and transmits the light having the wavelength λ2. The light having the wavelength λ2 transmitted by the fiber grating filter 81-5 is optoelectrically converted by the optical receiver 5-2.

The light having the wavelength λ1 reflected at the fiber grating filter 81-5 is input again into the dispersion compensator 7-3. The light having the wavelength λ1, after undergoing +400 ps dispersion compensation again in the dispersion compensator 7-3, is input into the port P2 of the optical circulator 6-4 and is output from the port P3 of the optical circulator 6-4. The light having the wavelength λ1 output from the port P3 of the optical circulator 6-4 is optoelectrically converted by the optical receiver 5-1.

The other output from the optical branching coupler 9-1 is input into a high-pass filter 12-1, which transmits light having wavelengths λ6 through λ9. The light having the wavelengths λ6 through λ9 output from the high pass filter 12-1 is input into the port P1 of the optical circulator 6-5 and output from the port P2 of the optical circulator 6-5.

The light having the wavelengths λ6 through λ9 output from the port P2 of the optical circulator 6-5 undergoes −400 ps dispersion compensation by the dispersion compensator 7-4, which is made of dispersion compensation fiber, and is input into the fiber grating filter 81-6. The fiber grating filter 81-6 reflects the wavelengths λ7 through λ9 and transmits the wavelength λ6. The light having wavelength λ6 transmitted by the fiber grating filter 81-6 is input into the optical receiver 5-6 and is optoelectrically converted.

The light having the wavelengths λ7 through λ9 is input again into the dispersion compensator 7-4 and undergoes −400 ps dispersion compensation. Thereafter, the light having wavelengths λ7 through λ9 is input into the port P2 of the optical circulator 6-5 and is output through the port P3 of the circulator 6-5. The light output from the port P3 of the optical circulator 6-5 is input into the port P1 of the optical circulator 6-6 and is output from the port P2 of the optical circulator 6-6.

The light output from the port P2 of the optical circulator 6-6 is input into the fiber grating filter 81-7. The fiber grating filter 81-7 reflects the light having wavelengths λ8 and λ9 and transmits the light having wavelength λ7. The light having the wavelength λ7 from the fiber grating filter 81-7 is input into the optical receiver 5-7 and optoelectrically converted.

The light having the wavelengths λ8 and λ9 reflected by the fiber grating filter 81-7 is input into the port P2 of the optical circulator 6-6 and output from the port P3 of the optical circulator 6-6. The light having the wavelengths λ8 and λ9 output from the port P3 of the optical circulator 6-6 is input into the port P1 of the optical circulator 6-7 and output from the port P2 of the optical circulator 6-7.

The light having the wavelengths λ8 and λ9 output from the port P2 of the optical circulator 6-7 undergoes dispersion compensation of −400 ps by the dispersion compensator 7-5, which is made of dispersion compensation fiber, and is input into the fiber grating filter 81-8. The fiber grating filter 81-8 reflects the light having the wavelength λ9 and transmits the light having wavelength λ8. The light having the wavelength λ8 transmitted by the fiber grating filter 81-8 is optoelectrically converted by the optical receiver 5-8.

The light having the wavelength λ9 reflected by the fiber grating filter 81-8 is input again into the dispersion compensator 7-5. After again undergoing −400 ps dispersion compensation by the dispersion compensator 7-5, the light having the wavelength λ9 is input into the port P2 of the optical circulator 6-7 and is output from the port P3 of the optical circulator 6-7. The light having the wavelength λ9 output from the port P3 of the optical circulator 6-7 is optoelectrically converted at optical receiver 5-9.

In accordance with the embodiment of the invention shown in FIG. 5, by connecting units comprising optical circulators and fiber grating filters, and units comprising optical circulators, dispersion compensators and fiber grating filters, and the ports P1 and P3 of the optical circulators of these units and repeating these connections, the number of multiplexed wavelengths can be increased.

Further, because the light makes round trips through the dispersion compensators, the dispersion compensation volume of the dispersion compensators can be reduced.

Also, because the intervals between the wavelengths are the same, the dispersion compensators that compensate secondary dispersion can all be configured from common dispersion compensators.

Figure 6A:
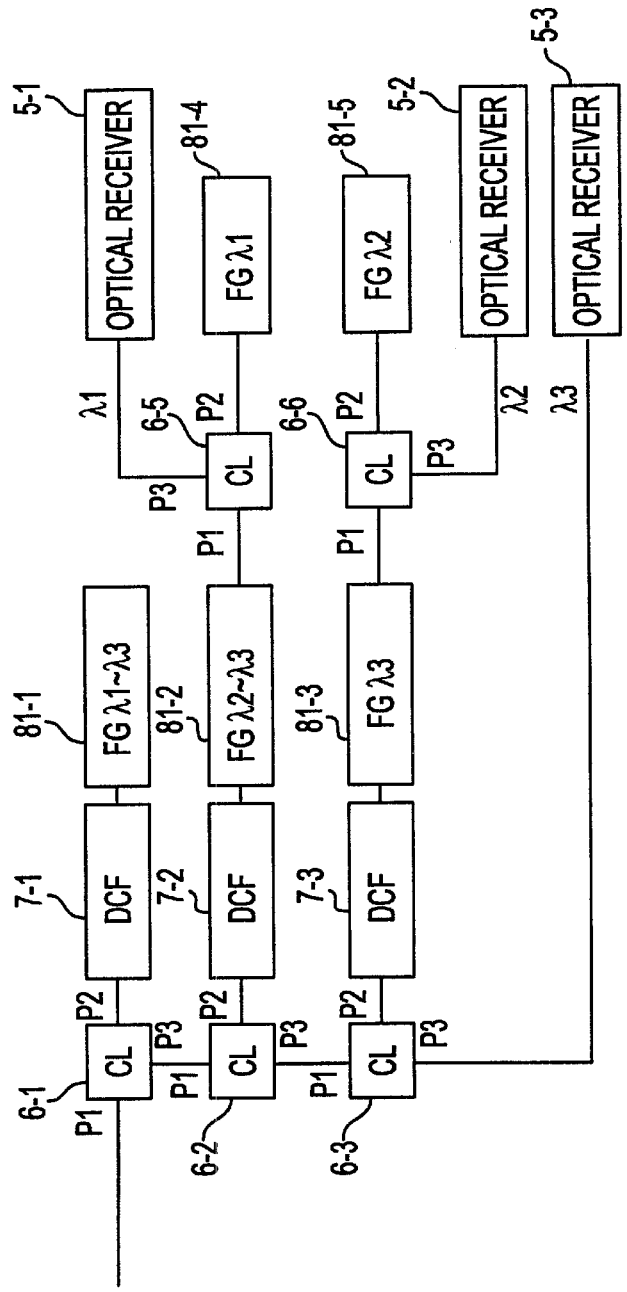
FIG. 6A is a block diagram of an optical demultiplexer in accordance with embodiments of the present invention.

FIG. 6A is a block diagram of a demultiplexer that is a combination of the demultiplexer shown in FIGS. 1A and 1B, wherein the multiplexed wavelengths are not equally spaced in accordance with embodiments of the present invention.

Figure 6B:
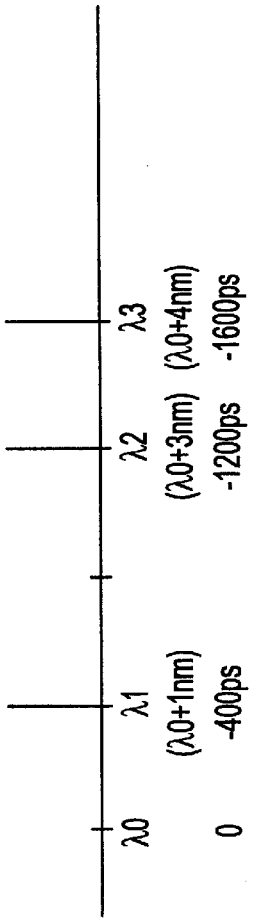
FIG. 6B is a graph in accordance with embodiments of the present invention.

As shown in FIG. 6B, light having wavelengths λ1 through λ3, which have been multiplexed at unequal intervals, is input into the port P1 of the optical circulator 6-1 and output from the port P2 of the optical circulator 6-1.

The multiplexed light output from the port P2 of the optical circulator 6-1 is input into the dispersion compensator 7-1, which is made of dispersion compensation fiber, and undergoes dispersion compensation at half the volume for wavelength λ0 to have a dispersion value of zero (0). The output of dispersion compensator 7-1 is input into the fiber grating filter 81-1.

The fiber grating filter 81-1 reflects all the wavelengths from λ1 through λ3. The wavelengths λ1 through λ3 reflected by the fiber grating filter 81-1 are again input into the dispersion compensator 7-1. Thus, the wavelength λ0 reaches a dispersion value of zero (0). The wavelengths λ1 through λ3 are input to the port P2 of the optical circulator 6-1 and are output from the port P3 of the optical circulator 6-1.

The light having the wavelengths λ1 through λ3 output from the port P3 of the optical circulator 6-1 is input into the port P1 of the optical circulator 6-2 and output from the port P2 of the optical circulator 6-2. The light having the wavelengths λ1 through λ3 output from the port P2 of the optical circulator 6-2 is input into either of the input/output ends of the dispersion compensator 7-2. The light having the wavelengths λ1 through λ3 undergoes −400 ps dispersion compensation by the dispersion compensator 7-2 and is input into the fiber grating filter 81-2.

The fiber grating filter 81-2 reflects the light having wavelengths λ2 and λ3 and returns them to the dispersion compensator 7-2. The wavelength λ1 is transmitted by the fiber grating filter 81-2 and input into the port P1 of the optical circulator 6-5. The light input into port P1 of the optical circulator 6-5 is output from the port P2 of the optical circulator 6-5. The light having wavelength λ1 is reflected at the fiber grating filter 81-4, input into the port P2 of the optical circulator 6-5 and output from the port P3 of the optical circulator 6-5.

The light having wavelength λ1 output from the port P3 of the optical circulator 6-5 is optoelectrically converted by the optical receiver 5-1. The light having wavelengths λ2 and λ3 reflected by the fiber grating filter 81-2 undergoes dispersion compensation again by the dispersion compensator 7-2, is input into the port P2 of the optical circulator 6-2 and output from the port P3 of the optical circulator 6-2.

The light output from the port P3 of the optical circulator 6-2 is input into the port P1 of the optical circulator 6-3 and output from the port P2 of the optical circulator 6-3. The light having the wavelengths λ2 and λ3 output from the port P3 of the optical circulator 6-3 is input into either of the input/output ends of the dispersion compensator 7-3, and undergoes −400 ps dispersion compensation and is input into the fiber grating filter 81-3.

The fiber grating filter 81-3 reflects the wavelength λ3 and returns the reflected wavelength λ3 to the dispersion compensator 7-3. The wavelength λ2 is transmitted and input into the port P1 of the optical circulator 6-6. The light input into the port P1 of the optical circulator 6-6 is output from the port P2 of the optical circulator 6-6. The light λ2 is reflected at the fiber grating filter 81-5, input into the port P2 of the optical circulator 6-6 and output from the port P3 of the optical circulator 6-6.

The light having wavelength λ2 output from the port P3 of the optical circulator 6-6 is optoelectrically converted by the optical receiver 5-2. The light having wavelength λ3 reflected at the fiber grating filter 81-3 undergoes dispersion compensation again at the dispersion compensator 7-3, is input into the port P2 of the optical circulator 6-3 and is output from the port P3 of the optical circulator 6-3. The light having the wavelength λ3 output from the port P3 of the optical circulator 6-3 is input into the optical receiver 5-3 and is optoelectrically converted.

Figure 7:
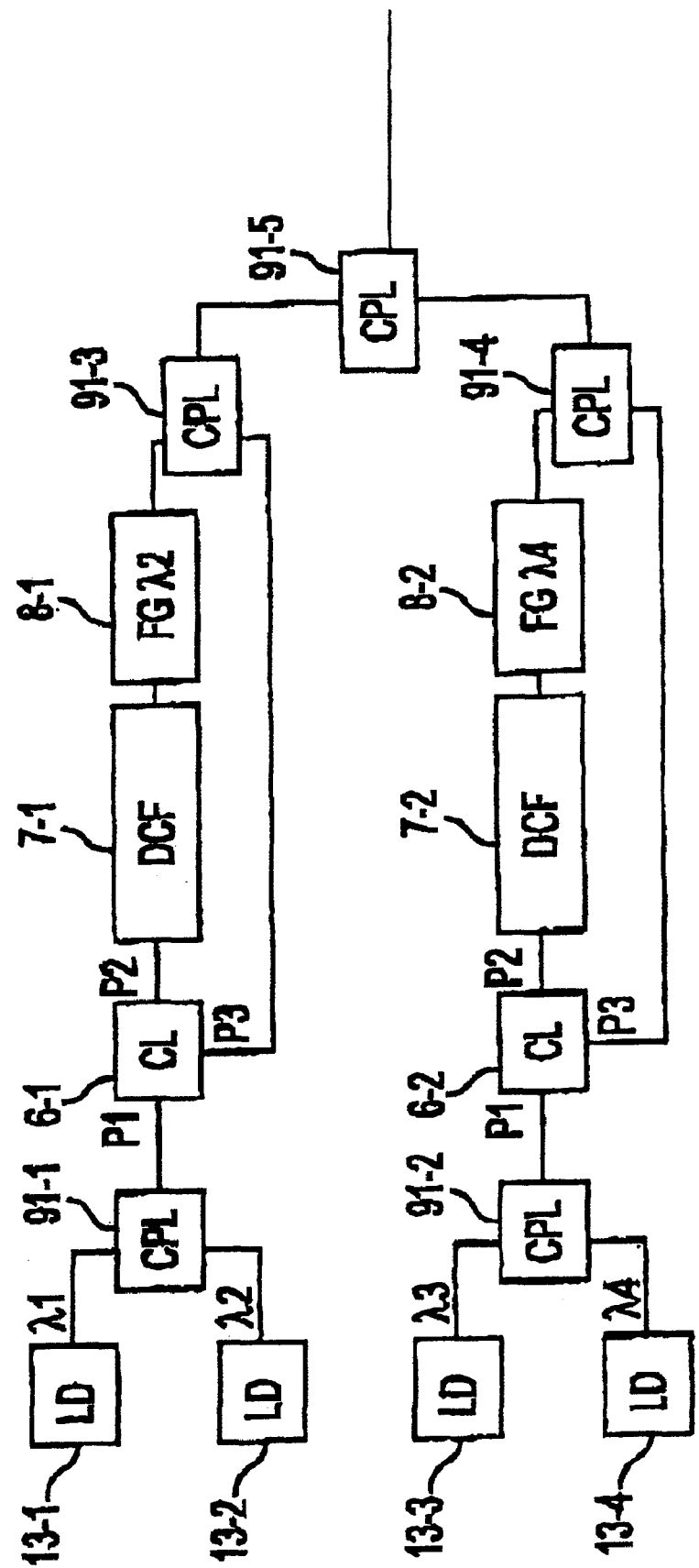
FIG. 7 is a block diagram of a wavelength division multiplexer in accordance with embodiments of the present invention.

FIG. 7 is a block diagram of a wavelength division multiplexing circuit wherein, when the sending station performs the wavelength division multiplexing, secondary dispersion arising along the transmission line is compensated simultaneously in accordance with embodiments of the present invention.

As shown in FIG. 7, an optical coupler 91-1 merges the output of a laser 13-1 that outputs light having a wavelength of λ1 and the output of a laser 13-2 that outputs light having a wavelength of λ2. The output λ1 of laser 13-1 and the output λ2 of laser 13-2, which have been combined at the optical coupler 91-1, are input into the port P1 of the optical circulator 6-1 and output from the port P2 of the optical circulator 6-1. The output from the port P2 of the optical circulator 6-1 is input into the dispersion compensator 7-1. Dispersion is applied and the output of dispersion compensator 7-1 is input into the fiber grating filter 8-1.

The light having the wavelength λ2 is reflected by the fiber grating filter 8-1 to the dispersion compensator 7-1. The light having the wavelength λ1 is transmitted by the fiber grating filter 8-1 and input into an optical merging coupler 91-3. Dispersion is applied again to the light having the wavelength λ2 reflected at the fiber grating filter 8-1 at the dispersion compensator 7-1, and the light is input into the port P2 of the optical circulator 6-1 and is output from the port P3 of the optical circulator 6-1.

The light output from the port P3 of the optical circulator 6-1 is input into the optical merging coupler 91-3 and merged again with the light having wavelength λ1.

An optical coupler 91-2 merges the outputs of a laser 13-3 that outputs light having a wavelength of λ3 and a laser 13-4 that outputs a light having a wavelength of λ4. The outputs of laser 13-3 having a wavelength λ3 and laser 13-4 having a wavelength λ4 are merged by optical coupler 91-2 are input into the port P1 of the optical circulator 6-2 and output from the port P2 of the optical circulator 6-2.

The output of the port P2 of the optical circulator 6-2 is input into the dispersion compensator 7-2. Dispersion is applied by the dispersion compensator 7-2 and the output of the dispersion compensator 7-2 is input into the fiber grating filter 8-2. The fiber grating filter 8-2 reflects the light having the wavelength λ4 into the dispersion compensator 7-2, and the light having the wavelength λ3 is transmitted and input into the optical merging coupler 91-4.

Dispersion is again applied to the light having the wavelength λ4 reflected by the fiber grating filter 8-2 at the optical circulator 7-2, is input into the port P2 of the optical circulator 6-2 and is output from the port P3 of the optical circulator 6-2. The light output from the port P3 of the optical circulator 6-2 is input into the optical merging coupler 91-4 and is merged again with the light having wavelength λ3.

The outputs of optical merging couplers 91-3 and 91-4, are input into an optical merging coupler 91-5 and are optically merged.

In accordance with the embodiment of the invention shown in FIG. 7, when secondary dispersion is compensated for individual wavelength, the dispersion compensation volume of the dispersion compensators is reduced.

Figure 8:
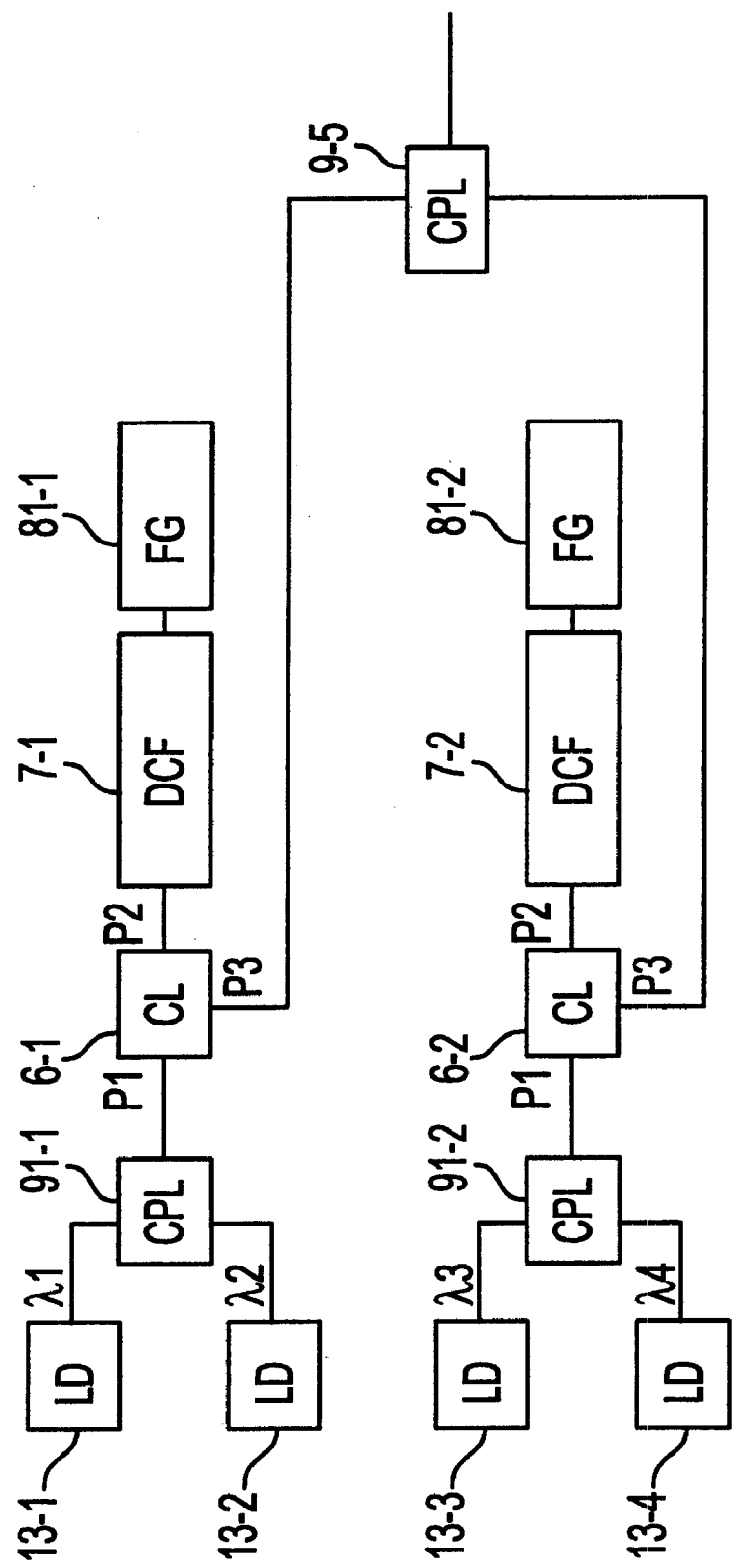
FIG. 8 is a block diagram of a wavelength division multiplexer in accordance with embodiments of the present invention.

FIG. 8 is a block diagram of a wavelength division multiplexing circuit wherein pre-compensation of wavelength dispersion is performed in units of blocks in accordance with embodiments of the present invention.

As shown in FIG. 8, the optical coupler 91-1 merges the output of the laser 13-1, which outputs light having a wavelength of λ1, and the output of the laser 13-2, which outputs light having a wavelength of λ2. The output of laser 13-1 having wavelength λ1 and the output of laser 13-2 having wavelength λ2 merged by the optical coupler 91-1 is input into the port P2 of the optical circulator 6-1 and output from the port P2 of the optical circulator 6-1.

The output from the port P2 of the optical circulator 6-1 is input into the dispersion compensator 7-1. Dispersion is applied and the output of dispersion compensator 7-1 is input into the fiber grating filter 81-1. The fiber grating filter 81-1 reflects the light having the wavelengths λ1 and λ2 so that the dispersion compensator 7-1 again applies dispersion to the light having wavelengths of λ1 and λ2.

The light having the wavelengths λ1 and λ2 that have had dispersion applied again at the dispersion compensator 7-1 are input into the port P2 of the optical circulator 6-1 and are output from the port P3 of the optical circulator 6-1. The light output from the port P3 of the optical circulator 6-1 is input into an optical merging coupler 9-5.

An optical coupler 91-2 merges the output of the laser 13-3, which outputs light having a wavelength of λ3, and the output of the laser 13-4, which outputs light having a wavelength of λ4. The output of laser 13-1 having wavelength λ3 and the output of the laser 13-4 having wavelength λ4 merged by the optical coupler 91-2 is input into the port P1 of the optical circulator 6-2 and output from the port P2 of the optical circulator 6-2.

The output from the port P2 of the optical circulator 6-2 is input into the dispersion compensator 7-2. Dispersion is again applied and the output of the dispersion compensator 7-2 is input into the fiber grating filter 81-2. The fiber grating filter 81-2 reflects the light having the wavelengths λ3 and λ4 so that the dispersion compensator 7-2 again applies dispersion to the light having wavelengths λ3 and λ4.

Dispersion is applied again to the light having the wavelengths λ3 and λ4 at the dispersion compensator 7-2 and the output of the dispersion compensator 7-2 is input into the port P2 of the optical circulator 6-2 and output from the port P3 of the optical circulator 6-2. The light output from the port P3 of the optical circulator 6-2 is input into the optical merging coupler 9-5.

Figure 9:
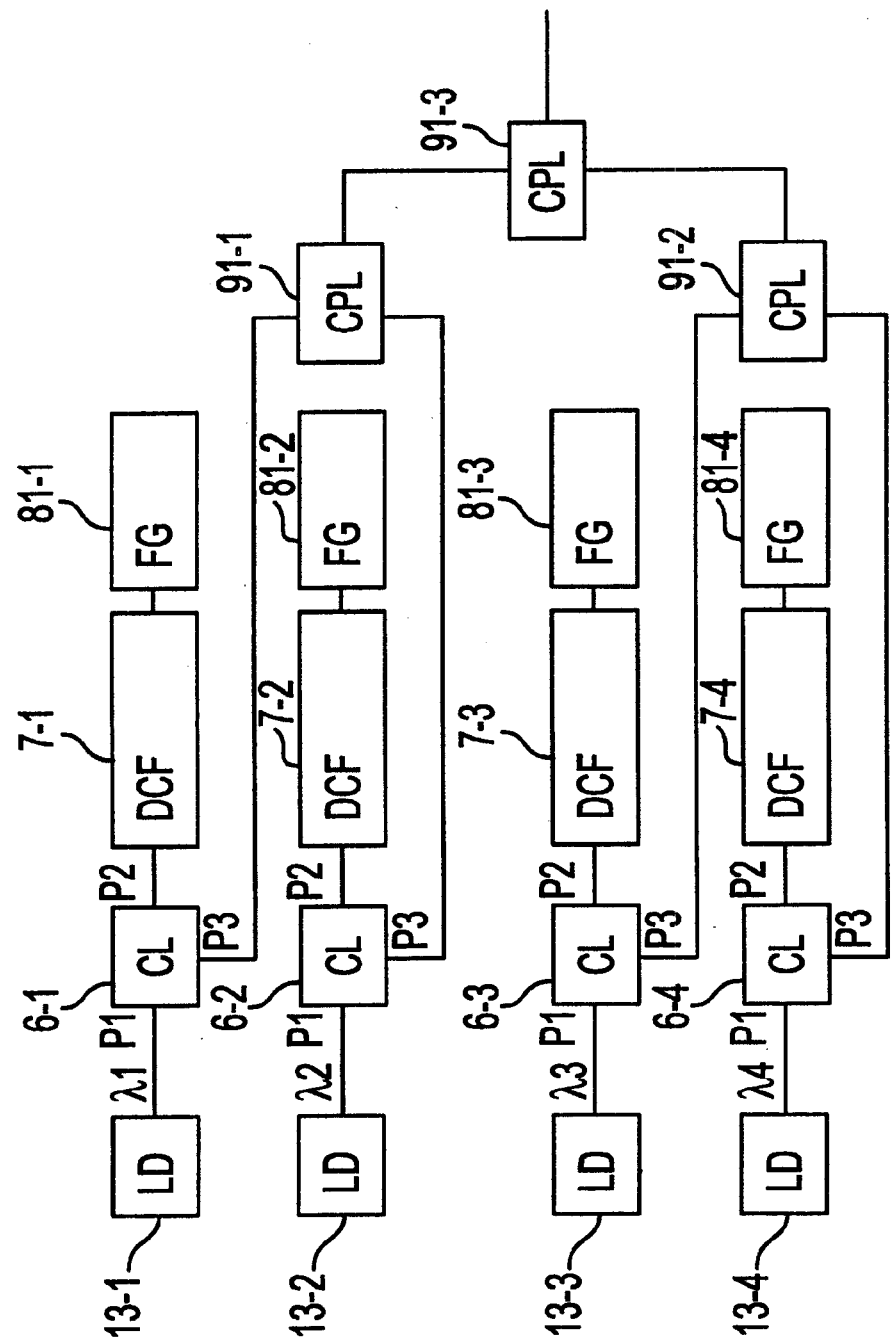
FIG. 9 is a block diagram of a wavelength division multiplexer in accordance with embodiments of the present invention.
Figure 10:
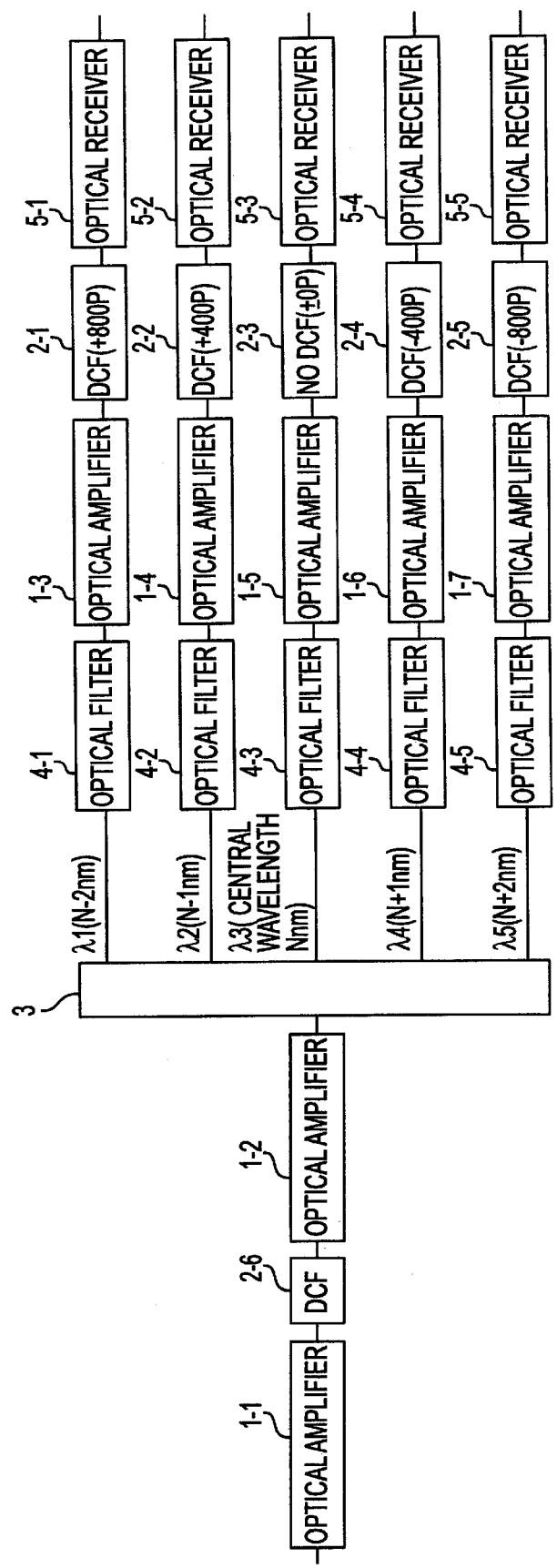
FIG. 10 is a block diagram of a conventional demultiplexer.

FIG. 9 is a block diagram of an optical transmission station to perform previous stage dispersion compensation individually for each wavelength in accordance with embodiments of the present invention.

As shown in FIG. 9, the optical circulator 6-1 inputs into the port P1 the output from the laser 13-1, which outputs light having a wavelength of λ1, and outputs the light having the wavelength λ1 from the port P2 of optical circulator 6-1.

The dispersion compensator 7-1 disperses the output from the port P2 of the optical circulator 6-1 and the output of the dispersion compensator 7-1 is input into the fiber grating filter 81-1. The fiber grating filter 81-1 reflects light having the wavelength of λ1 and inputs the reflected light again into the dispersion compensator 7-1.

Dispersion is again applied to the light having the wavelength λ1 input into the dispersion compensator 7-1. Thereafter, the light having wavelength λ1 is input into the port P2 of the optical circulator 6-1 and output from the port P3 of the optical circulator 6-1. The light having the wavelength λ1 output from the port P3 of the optical circulator 6-1 is input into the optical merging coupler 91-1.

The optical circulator 6-2 inputs into the port P1 the output from a laser 13-2, which outputs light having a wavelength of λ2, and outputs the light having wavelength λ2 from the port P2. The dispersion compensator 7-2 disperses the output from the port P2 of the optical circulator 6-2 and the output of the dispersion compensator 7-2 is input into the fiber grating filter 81-2. The fiber grating filter 81-2 reflects light having the wavelength of λ2 and inputs the reflected light having wavelength λ2 again into the dispersion compensator 7-2.

Dispersion is applied again to the light having the wavelength λ2 input into the dispersion compensator 7-2. Thereafter, the output of the dispersion compensator 7-2 is input into the port P2 of the optical circulator 6-2 and output from the port P3 of the optical circulator 6-2. The light having the wavelength λ2 output from the port P3 of the optical circulator 6-2 is input into the optical merging coupler 91-1.

The optical circulator 6-3 inputs into the port P1 the output from a laser 13-3, which outputs light having a wavelength of λ3, and outputs the light having wavelength λ3 from the port P2.

The dispersion compensator 7-3 disperses the output from the port P2 of the optical circulator 6-3 and inputs the output of dispersion compensator 7-3 into the fiber grating filter 81-3. The fiber grating filter 81-3 reflects the light having the wavelength of λ3 and inputs the light having wavelength λ3 again into the dispersion compensator 7-3.

Dispersion is applied again to the light having the wavelength λ3 input into the dispersion compensator 7-3.

Thereafter, light having wavelength λ3 to which dispersion is again applied is input into the port P2 of the optical circulator 6-3 and output from the port P3 of the optical circulator 6-3.

The light having the wavelength λ3 output from the port P3 of the optical circulator 6-3 is input into the optical merging coupler 91-2.

The optical circulator 6-4 inputs into the port P1 the output from the laser 134, which outputs light having a wavelength of λ4, and outputs the light having wavelength λ4 from the port P2.

The dispersion compensator 7-4 disperses the output from the port P2 of the optical circulator 6-4 and the dispersed output of dispersion compensator 7-4 is input into the fiber grating filter 81-4. The fiber grating filter 81-4 reflects light having the wavelength of λ4 and inputs the light having wavelength λ4 again into the dispersion compensator 7-4.

Dispersion is applied again to the light having the wavelength λ4 input into the dispersion compensator 7-4. Thereafter, the output of dispersion compensator 7-4 is input into the port P2 of the optical circulator 6-4 and output from the port P3 of optical circulator 6-4. The light having the wavelength λ4 output from the port P3 of the optical circulator 6-4 is input into the optical merging coupler 91-2.

The light having various wavelengths merged at optical merging couplers 91-1 and 91-2 is optically merged at an optical merging coupler 91-3 and is then sent out to the transmission route.

In accordance with embodiments of the present invention, in a system that partitions wavelength multiplexed light into wavelengths or groups of wavelengths and performs secondary dispersion compensation through wavelength differences, dispersion can be compensated using dispersion compensators with dispersion values below the required dispersion compensation value.

Similarly, in accordance with embodiments of the present invention, even when pre-dispersion of the wavelengths is performed at the transmitting station, and when secondary dispersion arising from differences in the transmitted wavelengths is dispersion compensated for individual wavelengths or for groups of wavelengths, dispersion can be compensated using dispersion compensators with dispersion values below the required dispersion compensation value.

Further, in accordance with embodiments of the present invention, demultiplexing can be performed without using optical demultiplexing couplers.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. An optical demultiplexer device, comprising:
   a first optical demultiplexer circuit, including
      a first optical circulator having a first port, a second port and a third port, wherein multiplexed light is input into the first port, and the light input to the first port is output from the second port, and light input into the second port is output from the third port;
      a dispersion compensator having an input unit and an output unit, the dispersion compensator being coupled to the second port of the first optical circulator at an end of the input unit or output unit;
      a first optical filter coupled to another end of the input or output unit to reflect light having a specified wavelength and to transmit light having a wavelength other than the specified wavelength;
      a second optical circulator having a first port, a second port and a third port, wherein the light transmitted by the first optical filter is input to the first port of the second optical circulator; and
      a second optical filter coupled to the second port of the second optical circulator to reflect the light transmitted by the first optical filter having a specified wavelength,
      wherein the third port of the second optical circulator outputs a light from the second optical filter.

2. An optical demultiplexer as recited in claim 1, wherein the first optical filter reflects light having a plurality of specified wavelengths, and transmits light having a plurality of wavelengths other than the plurality of specified wavelengths.

3. An optical demultiplexer device as recited in claim 1, further comprising:
   a second optical demultiplexer circuit, including
      a first optical circulator having a first port, a second port and a third port, wherein multiplexed light is input into the first port, and the light input to the first port is output from the second port, and light input into the second port is output from the third port;
      a dispersion compensator having an input unit and an output unit, the dispersion compensator being coupled to the second port of the first optical circulator at an end of the input unit or output unit;
      a first optical filter coupled to another end of the input or output unit to reflect light having a specified wavelength and to transmit light having a wavelength other than the specified wavelength;
      a second optical circulator having a first port, a second port and a third port, wherein the light transmitted by the first optical filter is input to the first port; and
      a second optical filter coupled to the second port of the second optical circulator to reflect light transmitted by the first optical filter having a specified wavelength.

4. An optical demultiplexer device as recited in claim 3, wherein multiplexed light branched into a plurality of wavelengths is input into the first port of the first optical circulator of the first optical demultiplexer circuit, and is input into the first port of the first optical circulator of the second optical demultiplexer circuit.

5. A demultiplexer device as recited in claim 3, wherein the third port of the first optical circulator of the first optical demultiplexer circuit is coupled to the first port of the first optical circulator of the second optical demultiplexer circuit.

6. A demultiplexer device, comprising:
   a first unit, including
      a first optical circulator having a first port, a second port and a third port, wherein multiplexed light is input to the first port, and the light input to the first port is output from the second port, and light input into the second port is output from the third port;
      a first dispersion compensator having one of an input or an output end connected to the second port of the first optical circulator; and
      a first filter connected to an other end of the first dispersion compensator opposite the one of the input or output end, to reflect light having a specified wavelength and to transmit light having a wavelength other than the specified wavelength; and
   a second unit, including
      a second optical circulator having a first port, a second port and a third port, wherein the first port of the second optical circulator is coupled to the third port of the first optical circulator, and light input to the first port of the second optical circulator is output to the second port of the second optical circulator, and light input to the second port of the second optical circulator is output to the third port of the second optical circulator; and a second filter coupled to the second port of the second optical circulator to reflect light having a specified wavelength and to transmit light having a wavelength other than the specified wavelength.

7. A demultiplexer device as recited in claim 6, wherein the demultiplexer device comprises a plurality of first units and second units, and the first port of the first optical circulator of the first unit is coupled to the third port of the second optical circulator of the second unit, and the first unit and the second unit are respectively consecutively repeated.

8. A wavelength division multiplexing device, comprising:

a first wavelength division multiplexing circuit, including
    an optical coupler to merge light having different wavelengths from a plurality of light sources;
    an optical circulator including a first port, a second port and a third port, wherein the first port receives an output from the optical coupler, and the light input to the first port is output to the second port, and light input to the second port is output from the third port;
    a dispersion compensator connected at one of an input or output end to the second port of the optical circulator;
    an optical filter coupled to an other end of the dispersion compensator opposite the one of the input or output end, to reflect light having a specified wavelength and to transmit light having a wavelength other than the specified wavelength; and
    an optical coupler to merge the output of the optical filter and the output of the third port of the optical circulator.

9. A wavelength division multiplexing device as recited in claim 8, further comprising:

a second wavelength division multiplexing circuit, including
    an optical coupler to merge light having different wavelengths from a plurality of light sources;
    an optical circulator including a first port, a second port and a third port, wherein the first port receives an output from the optical coupler, and the light input to the first port is output to the second port, and the light input to the second port is output from the third port;
    a dispersion compensator having an input end and an output end and coupled at either one of the input or output end to the second port of the optical circulator;
    an optical filter coupled to an other end of the dispersion compensator to reflect light having a specified wavelength and to transmit light having a wavelength other than the specified wavelength; and
    an optical coupler to merge the output of the optical filter and the output of the third port of the optical circulator.

10. A wavelength division multiplexing device as recited in claim 9, further comprising an optical coupler to merge outputs of the optical couplers of the first wavelength division multiplexing circuit and the second wavelength division multiplexing circuit.

11. An optical wavelength multiplexing device, comprising:

a plurality of wavelength division multiplexing circuits, each of the plurality of circuits including,
    an optical coupler to merge light having different wavelengths from a plurality of light sources and to output the merged light;
    an optical circulator having a first port, a second port and a third port, wherein the first port receives the output from the optical coupler, and the light input to the first port is output to the second port, and the light input to the second port is output to the third port;
    a dispersion compensator having an input end and an output end and coupled at one of the input or output end to the second port of the optical circulator;
    an optical filter coupled to the other end of the dispersion compensator opposite the one of the input or output end, to reflect light having a specified wavelength and to transmit light having a wavelength other than the specified wavelength; and
    an optical coupler to merge the respective outputs of the third ports of the optical circulators of the plurality of wavelength division multiplexing circuits.

12. An optical wavelength multiplexing device, comprising:

a plurality of dispersion compensation units, the respective dispersion compensation units including
    an optical coupler to merge light having different wavelengths from a plurality of, light sources and to output the merged light;
    an optical circulator having a first port, a second port and a third port, wherein the first port receives the output from the optical coupler, and the light output from the first port is input to the second port, and the light input to the second port is output from the third port;
    a dispersion compensator having an input end and an output end and coupled at one of the input or output end to the second port of the optical circulator;
    an optical filter coupled to the other end of the dispersion compensator opposite the one of the input or output end, to reflect light having a specified wavelength and to transmit light having a wavelength other than the specified wavelength; and
    an optical coupler to merge the output of the optical filter and the output of the third port of the optical circulator of the plurality of dispersion compensation units.

13. An optical demultiplexer, comprising:

a dispersion compensator to receive multiplexed light and to disperse the received multiplexed light at a predetermined dispersion value;

a first reflecting and transmitting device, coupled to an end of the dispersion compensator which does not receive the multiplexed light, to reflect light having a specified wavelength and to transmit light having a wavelength other than the specified wavelength, wherein the light having the specified wavelength is reflected through the dispersion compensator such that the light having the specified wavelength passes through the dispersion compensator a plurality of times;

a first optical circulator coupled to the dispersion compensator and having a first port, a second port and a third port, wherein the multiplexed light is input into the first port, the light input to the first port is output to the dispersion compensator via the second port, and light input into the second port is output from the third port;

a second optical circulator coupled to the first reflecting and transmitting device and having a first port, a second port and a third port, to receive the light transmitted by the first reflecting and transmitting device at the first port and to output the light received at the first port to the second port, and to output light received at the second port from the third port; and a second reflecting and transmitting device coupled to the second port of the second optical circulator to reflect light having the wavelength other than the specified wavelength.

14. An optical demultiplexer, comprising:

a dispersion compensator to receive multiplexed light and to disperse the received multiplexed light at a predetermined dispersion value;

a first reflecting and transmitting device, coupled to an end of the dispersion compensator which does not receive the multiplexed light, to reflect light having a specified wavelength and to transmit light having a wavelength other than the specified wavelength, wherein the light having the specified wavelength is reflected through the dispersion compensator such that the light having the specified wavelength passes through the dispersion compensator a plurality of times;

a second dispersion compensator to receive the multiplexed light and to disperse the received multiplexed light at a predetermined dispersion value;

a second reflecting and transmitting device, coupled to an end of the dispersion compensator which does not receive the multiplexed light, to reflect light having a specified wavelength and to transmit light having a wavelength other than the specified wavelength, wherein the light having the specified wavelength is reflected back through the second dispersion compensator such that the light having the specified wavelength passes through the second dispersion compensator a plurality of times, and wherein the multiplexed light includes a plurality of;wavelengths, and the plurality of wavelengths are respectively branched to first and second dispersion compensators.

15. An optical demultiplexer, comprising:

a first unit, including
  a first optical circulator to circulate light; and
  a first reflecting and transmitting device to receive light from the first optical circulator;

a second unit, including
  a second optical circulator connected to the first optical circulator to receive light from the first optical circulator;
  a dispersion compensator connected to the second optical circulator to recieve the light from the first optical circulator via the second optical circulator and to perform dispersion compensation on the light; and
  a second reflecting and transmitting device to reflect light having a specified wavelength to the dispersion compensator, wherein the dispersion compensator performs dispersion compensation twice on the reflected light having the specified wavelength.

16. A optical demultiplexer as recited in claim 15, further comprising:

a plurality of first and second units, wherein first and second optical couplers of the respective first and second units are connected.

\* \* \* \* \*